Jan. 30, 1951  E. S. HUNT  2,539,539
GLASS RUN GUIDE FOR VEHICLE WINDOWS
Filed June 12, 1947
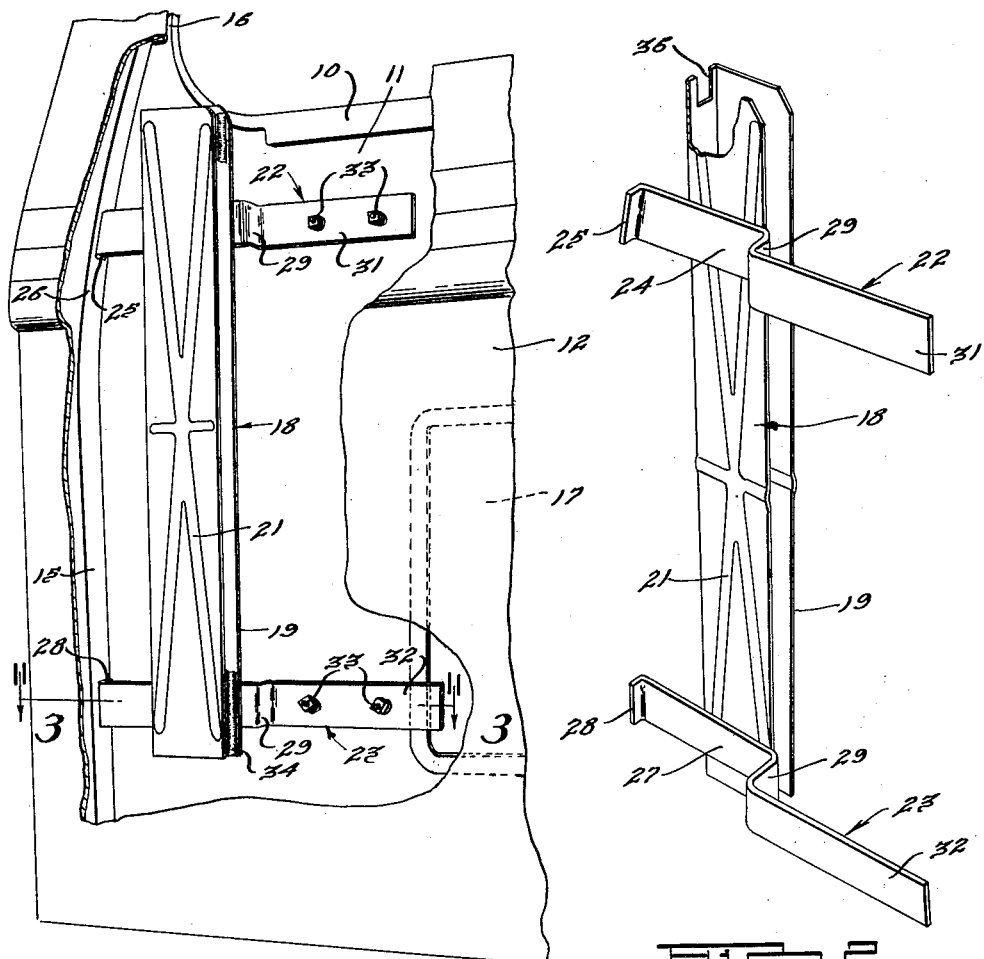
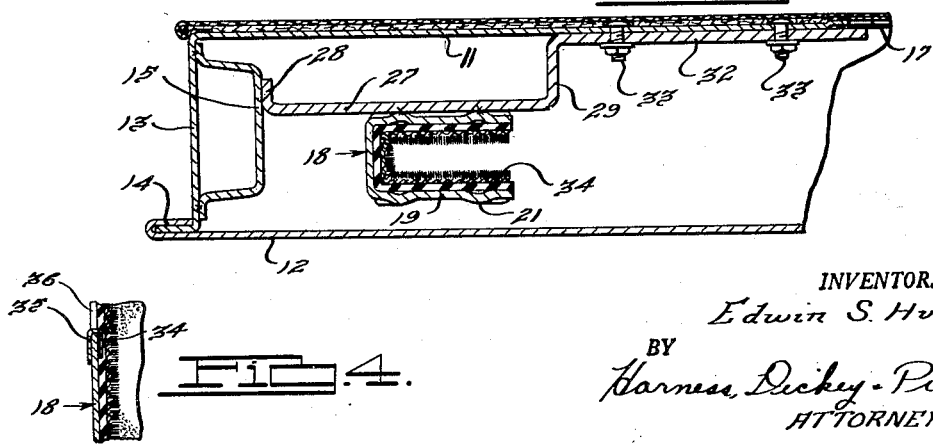
INVENTOR.
Edwin S. Hunt.
BY
Harness, Dickey-Pierce,
ATTORNEYS.

Patented Jan. 30, 1951

2,539,539

UNITED STATES PATENT OFFICE 2,539,539

GLASS RUN GUIDE FOR VEHICLE WINDOWS

Edwin S. Hunt, Detroit, Mich.

Application June 12, 1947, Serial No. 754,128

7 Claims. (Cl. 296—44.5)

1

This invention relates to glass run guides for doors and particularly to a replaceable glass run guide which may be attached to the door through an aperture provided in the inner panel thereof without marring or cutting the door in any manner.

In constructing automobile doors, glass run guides are provided for the window glass along the forward, top and rear edges of the door above the belt line at the window opening. Separate glass run guides are provided within the inner and outer panels below the belt line aligned with the run guides at the opening. It was found through use that the support for the glass run guide below the belt line within the door would break from its support, preventing the operation of the window. Especially is this true of doors on trucks which receive severe usage and abuse. Considerable time and expense were required heretofore to repair the door and secure a glass run guide therein.

The present invention pertains to a glass run guide and supports therefor so constructed that they may be mounted through the opening in the inner door panel provided for the installation of the window regulator. Brackets are secured on the glass run guide which accurately locate the glass run guide in continuation of that provided above the belt line. The brackets engage the inner wall of the inner door panel through which bolts are placed for securing the brackets in position.

Accordingly, the main objects of the invention are: to provide a glass run guide having a suitable positioning bracket which locates the guide in continuation of that at the window opening; to provide a channel element mounted on a pair of supporting brackets which are shaped to position the channel element in continuation of the glass guide at the window and which engages the inner panel and is bolted thereto for supporting the channel element thereon; and, in general, to provide a replaceable glass run guide which may be inserted in glass supporting position below the belt line without cutting openings in the door panels, which is simple in construction and easily installed.

Other objects and features of novelty of the invention will be specifically pointed out or will become apparent when referring, for a better understanding of the invention, to the following description taken in conjunction with the accompanying drawing, wherein:

Figure 1 is a broken view in elevation of a

2 door having a glass run guide attached thereto embodying features of this invention;

Fig. 2 is a broken perspective view of the glass run guide illustrated in Fig. 1;

Fig. 3 is an enlarged sectional view of the structure illustrated in Fig. 1, taken on the line 3—3 thereof; and Fig. 4 is a sectional view of the structure illustrated in Fig. 2, with the felt for the glass run guide in position.

In the figures, a vehicle door 10 is illustrated, comprising an inner panel 11 and an outer panel 12 of conventional form. As illustrated in Fig. 3, the inner panel forms the rail 13 and flange 14 over which the outer panel 12 is reversely bent and secured in position. An inner reinforcing channel 15 may be secured on the inner face of the rail portion 13 of the door to provide additional strength thereto. It is to this rail that the glass run guide below the window opening is secured by suitable brackets which align it with the glass guide 16 provided about the window opening.

The inner panel 11 of the door of the vehicle is provided with a central opening 17 through which the glass run guide is inserted between the door panels. When the glass run guide below the window opening breaks from its support, it may be removed through the opening 17 and the supports may be removed from the reinforcing channel element 15 or flattened thereon and the glass run guide unit 18 may be installed in position in alignment with the glass run guide 16 at the window opening.

The unit 18 embodies a channel element 19 having suitable reinforcing ribs 21, which are herein illustrated in angular relation to each other to provide strength. A pair of brackets 22 and 23 is welded or otherwise secured to one face of the channel element 19 near the top and bottom thereof. It is to be understood that a single wider bracket may be substituted for the pair of brackets. The portion 24 of the bracket 22 welded to the side of the element 19 is flanged outwardly at 25 on the end and is formed in sloping relation to the lateral dimension of the bracket. As will be noted in Fig. 1, the reinforcing channel element 15 slopes toward the window opening at 26 and the flange 24 is so positioned as to abut the channel portion and position the upper end of the channel element 19 in alignment with the glass guide 16.

The portion 27 of the bracket 23 secured to the wall of the element 19 has a flange 28 on the end thereof which abuts the web of the channel reinforcing element 15, as illustrated in Fig. 3. The flanges 25 and 28 accurately position the channel element from the rail of the door. The opposite end of the portions 24 and 27 of the brackets 22 and 23 is offset outwardly at 29 to have the portions 31 and 32 engage the inner surface of the inner panel 11, as illustrated in Fig. 3.

A clamp is applied to the panel adjacent to the opening 17 and to the bracket 23, and holes are drilled through the inner panel 11 and through the portion 32 of the bracket. Bolts 33 are inserted in the holes in the panel 11 and the portion 32 of the bracket upon which nuts are screwed to clamp the bracket to the panel 11. Thereafter, holes are drilled through the inner panel 11 and the upper bracket 22 after a bar has been inserted at the window opening downwardly between the inner and outer panels for holding the portion 31 of the bracket 22 against the inner panel 11. Similar bolts 33 are then installed through the drilled holes in the inner panel 11 and bracket portion 31, and the top bracket is thereby firmly secured in position.

Before installation, a glass run felt 34 is secured to the inner surface of the sides and web portions of the channel element 19 by the application of a suitable adhesive and also by the use of a hook 35 which is provided in the felt material 34 and which registers in a notch 36 in the top edge of the web of the channel element 19, as illustrated in Fig. 4. The hook 35 assists the adhesive material in preventing the felt strips 34 from loosening through the downward movement of the window glass.

The channel unit thus provided is rugged in construction, easily installed, and provides a glass run guide below the window opening which is much stronger than the one originally provided. The installation of the unit is made through an opening provided in the inner panel of the door, thereby eliminating the necessity of cutting holes in the inner panel and patching up the holes which consumes considerable time and increases the cost of installation. It is to be understood that in place of the two spaced brackets, a single bracket of substantial length could be substituted therefor and still fall within the scope of the present invention.

What is claimed is:

1. A channel element for replacing a channel originally provided in a vehicle door for receiving and guiding a window glass below the window opening therein, said door having an outer and inner panel spaced by a peripheral rail, including an element formed in channel shape having a web and two side portions, a pair of vertically spaced brackets secured to said element and projecting laterally therebeyond, the projecting ends on one side being dimensioned to accurately locate the channel below the window opening in spaced relation to the door rail, the projecting ends on the opposite side being engageable with the inner panel in position to be bolted thereto.

2. A channel element for replacing a channel originally provided in a vehicle door for receiving and guiding a window glass below the window opening therein, said door having an outer and inner panel spaced by a peripheral rail, including an element formed in channel shape having a web and two side portions, a pair of vertically spaced brackets secured to said element and projecting laterally therebeyond, the projecting ends on one side being dimensioned to accurately locate the channel below the window opening in spaced relation to the door rail, the projecting ends on the opposite side being engageable with the inner panel in position to be bolted thereto, and a felt material secured to the inner faces of the channel element.

3. A channel element for replacing a channel originally provided in a vehicle door for receiving and guiding a window glass below the window opening therein, said door having an outer and inner panel spaced by a peripheral rail, including an element formed in channel shape having a web and two side portions, a pair of vertically spaced brackets secured to said element and projecting laterally therebeyond, the projecting ends on one side being dimensioned to accurately locate the channel below the window opening in spaced relation to the door rail, the projecting ends on the opposite side being engageable with the inner panel in position to be bolted thereto, the projecting ends for locating the channel element being flanged laterally to provide width thereto.

4. A replaceable glass run guide channel for a door having an outer panel and an inner panel provided with an opening having a glass run guide portion, including a channel member having a web and two side portions, at least one bracket secured to one side wall of the channel member and extending forwardly and rearwardly beyond the edges thereof, the forwardly extending portion being flanged laterally and positioned for accurately locating the channel element with reference to the run guide portion of the door opening and the opposite portion being formed to engage the inner surface of the inner door panel to which it may be secured, the assembly being so formed as to be insertable between the inner and outer door panels through the opening provided in the inner panel.

5. A replaceable glass run guide unit for a door below the window opening thereof including, in combination, a channel member having a narrow web and extended side portions, a pair of brackets secured to one wall of the channel member projecting beyond the web portion and the open channel edge, the portions projecting beyond the web portion being of different length and flanged laterally to mate with door rail portions for accurately locating the channel with relation to the guide run channel at the window opening of the door, the portions of the brackets extending beyond the open end of the channel being formed to engage the inner surface of the door to which it may be secured.

6. A replaceable glass run guide unit for a door below the window opening thereof including, in combination, a channel member having a narrow web and extended side portions, a pair of brackets secured to one wall of the channel member projecting beyond the web portion and the open channel edge, the portions projecting beyond the web portion being of different length and flanged laterally to mate with door rail portions for accurately locating the channel with relation to the guide run channel at the window opening of the door, the portions of the brackets extending beyond the open end of the channel being formed to engage the inner surface of the door to which it may be secured, and a channel-shaped buffing member secured on the inner faces of the web and side portions of the channel member.

7. A replaceable glass run guide unit for a door below the window opening thereof including, in combination, a channel member having a narrow web and extended side portions, a pair of brackets secured to one wall of the channel member projecting beyond the web portion and the open channel edge, the portions projecting beyond the web portion being of different length and flanged laterally to mate with door rail portions for accurately locating the channel with relation to the guide run channel at the window opening of the door, the portions of the brackets extending beyond the open end of the channel being formed to engage the inner surface of the door to which it may be secured, the side portions of the channel member having reinforcing means thereon to provide strength, and projecting portions engaged by the brackets to which they are welded or otherwise secured.

EDWIN S. HUNT.

REFERENCES CITED

The following references are of record in the file of this patent:

UNITED STATES PATENTS

| Number | Name | Date |
|---|---|---|
| 2,236,449 | Roethel | Mar. 25, 1941 |